Sept. 25, 1951 J. T. GREELEY 2,568,854
JOURNAL LUBRICATOR
Filed April 5, 1947 2 Sheets-Sheet 1
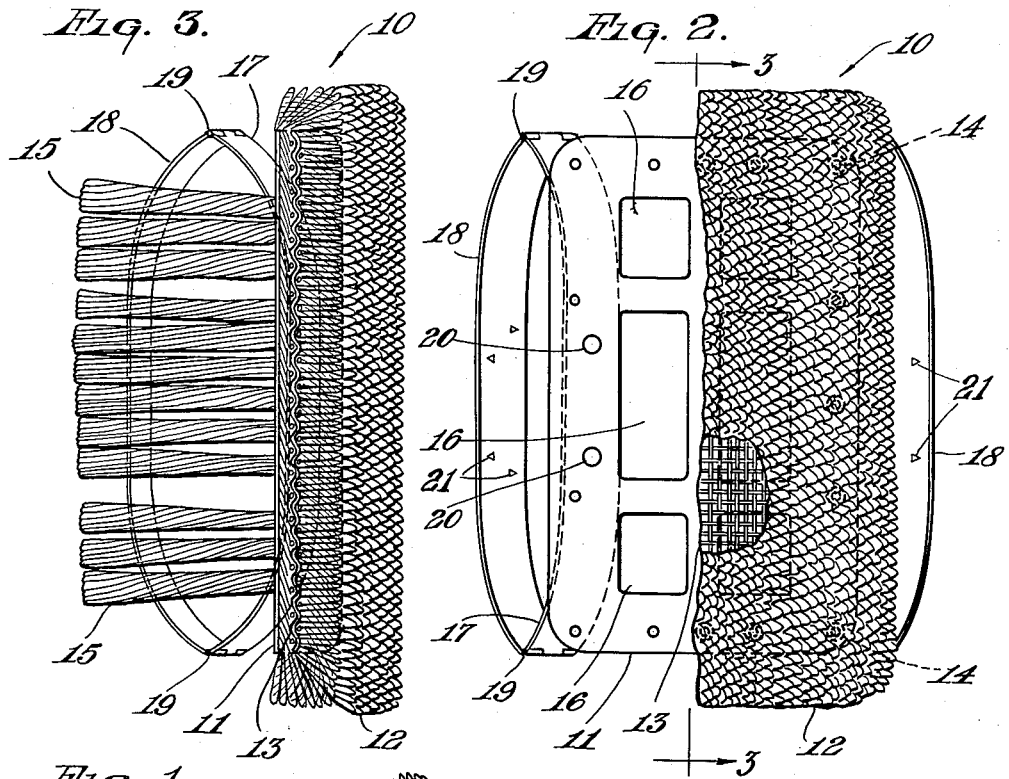
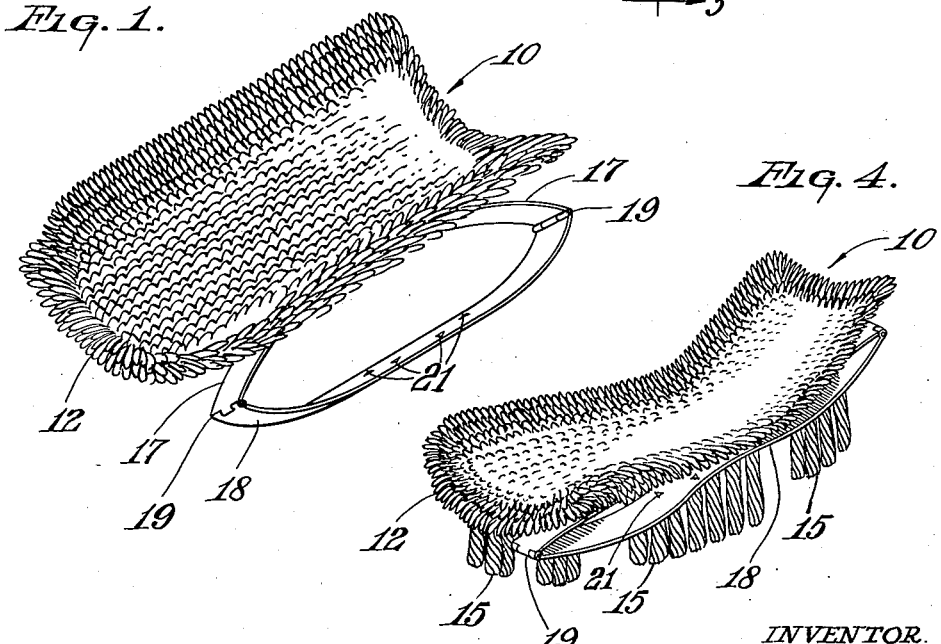
INVENTOR.
JOSEPH T. GREELEY
BY Charles F. Kaegebehn
ATTORNEY.

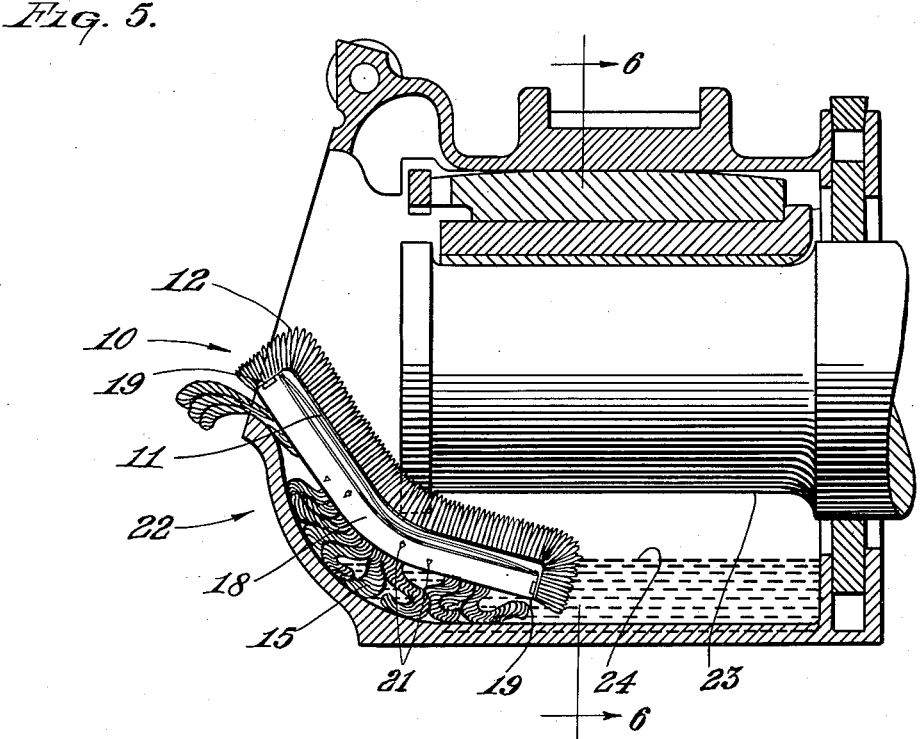
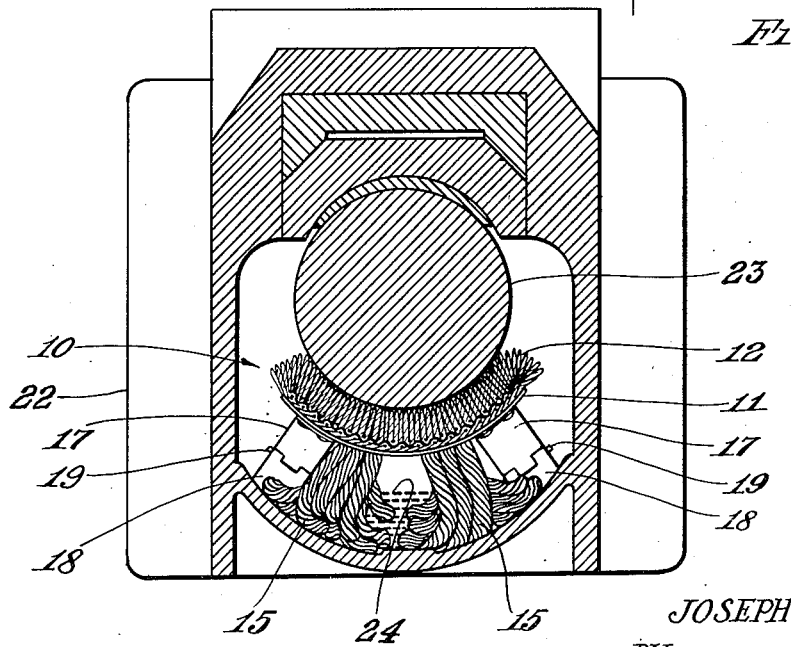

Patented Sept. 25, 1951

2,568,854

UNITED STATES PATENT OFFICE 2,568,854

JOURNAL LUBRICATOR

Joseph T. Greeley, Philadelphia, Pa., assignor to National Lead Company, New York, N. Y., a corporation of New Jersey Application April 5, 1947, Serial No. 739,673

2 Claims. (Cl. 308—88)

This invention relates to a device adapted for lubrication of journals and more particularly for the lubrication of the axle journals of railroad cars and locomotives.

Standard journal boxes on railroad equipment have generally been heretofore simply filled with oil soaked waste. This arrangement has resulted in somewhat unreliable lubrication and also the dangerous possibility of loose waste working in between the journal and the bearing brass. Improvement of this situation has more recently been attempted by provision of a lubricating pad which conforms roughly in size and shape to the under side of the journal and against which it is held by spring tension. The pad receives oil through wicks dipping into a reservoir in the base of the box. Such devices, however, have found restricted application, since insufficient clearance often exists in the standard journal box between the end of the journal and the housing to permit insertion and removal of an assembly of size and shape commensurate with the journal. Articulated or hinged lubricator devices have been proposed to permit the same to be folded or collapsed to permit insertion, however, such devices are obviously complicated mechanically and comparatively expensive. In addition, an uninterrupted and uniform support for the pad itself is difficult to obtain with a sectionalized framework.

This invention has for its object, therefore, the provision of a journal lubricator which may be readily inserted and removed from a standard journal box. An additional object of this invention is to provide such a journal lubricator of simple design and which will be economical to manufacture. A further object is to provide such a lubricator having a unitary supporting structure which will provide uniform and continuous support to the lubricating pad.

The novel journal lubricator of this invention may be more clearly understood by reference to the accompanying drawings in which Fig. 1 illustrates a general view of the lubricator of this invention.

Fig. 2 shows a general plan view of the lubricator with part of the lubricating pad cut away to show the supporting structure.

Fig. 3 shows a sectionalized view taken along the line 3—3 of Fig. 2.

Fig. 4 shows the lubricator as distorted or bent for insertion into the journal box.

Fig. 5 illustrates the manner in which the distorted or bent lubricator is inserted into the journal box.

Fig. 6 shows a sectionalized view of the lubricator in place in the journal box as it would appear along the line 6—6 of Fig. 5.

Referring now to Figs. 1 and 2, the journal lubricator 10 comprises a unitary pad supporting plate 11 which, for the purpose of this invention is made of resilient material, as for instance, light spring steel, and which is normally arcuate laterally. The plate 11 carries pad 12 which may be composed of absorbent material such a bundles of cotton waste interwoven in backing 13 which in turn is fastened to the plate 11 as for instance, by means of rivets 14. Wicks 15, which supply oil by capillary action, are embedded in the pad 12 and pass through apertures or perforations 16 in the plate 11. Tension means to urge the pad against the under surface of the journal may comprise generally elliptical spring elements, projecting radially as illustrated and composed of upper spring members 17 and lower spring members 18 hinged at their extremities as at 19 and attached to the under surface of the plate 11 as by rivets 20. Gripping means are provided on the under surface of the lower spring member 18, and may preferably comprise teeth 21 formed by small downwardly projecting, triangular sections of the spring member.

Referring now to Figs. 3 and 4, the plate 11 is normally so curved as to impart a shape to the pad 12 which closely conforms to the under side of the journal. The normal or working shape of the lubricator is as illustrated in Fig. 3, and it should be specially noted that the curvature of the pad and the supporting plate is lateral, that is, curved across its width, these elements being longitudinally straight. Due to the unique resilient construction of the plate 11 however, the device may be temporarily distorted so as to be bent transversely of its length as shown in Fig. 4. This may be accomplished by flattening out the lateral curvature, manually or by mechanical means as desired, at a convenient point between the ends, whereupon the longitudinal rigidity is lost and a temporary transverse bend may readily be induced. In this condition, the device may be easily inserted into the journal box as is illustrated in Fig. 5 in which the lubricator 10 is shown partially inserted in the journal box 22, underneath the journal 23. After the lubricator is completely inserted and released, the tension in the spring plate 11 will cause it to resume its normal shape, i. e. that illustrated in Fig. 3 and it will then be in working position as illustrated in Fig. 6. In this position, the pad 12 fits the lower portion of the journal 23 and is held snugly against it by the action of spring members 17 and 18 resting on the inside of the base of the journal box and pressing the supporting plate upwardly. The teeth 21 projecting from the lower surface of spring 18 grip the interior surface of the journal box housing to prevent movement or shifting of the device during operating use. Wicks 15 dip into oil reservoir 24 in the journal box base to supply lubricating oil to the pad.

The general dimensions of the lubricator should be appropriate for the size of the journal and journal box. The size of the lubricating pad should be sufficient so that an ample supply of oil is distributed over the required length of the journal. The springs of the lubricator should be such that they contact the inside of the base of the journal box and exert suitable pressure to keep the device in position with the pad pressed against the under side of the journal.

It will be apparent that the lubricator may be removed from the journal box by use of the same procedure by which it was inserted. When transversely bent, it may be readily removed, and a simple tool, the design of which will be obvious to those skilled in the art, may be used to assist in removal if desired. Any method of grasping the device when in the box may be employed, and as the device is pulled outwardly, the unique design of the supporting plate permits the temporary transverse bend to be formed so as to distort the device into condition for ready removal.

The journal lubricator of this invention provides a lubricating pad which when in place is uniformly and continuously held in contact with the under side of an axle journal. The unitary plate on which the pad is mounted, insures continuous contact along the length of the journal and effective lubrication of the same. The unique construction makes possible the ready insertion and removal of the device from a standard journal box; yet this is accomplished without complicated, hinged or articulated plate structures. The device is simple and economical to manufacture as will be apparent.

This application is a continuation-in-part of my application, Serial No. 715,949, filed December 13, 1946, now abandoned.

While the invention has been described with particular reference to the embodiment illustrated in the annexed drawings, it is not intended to be restricted specifically thereto and other modifications and embodiments may be employed as limited by the following claims.

I claim:

1. In a journal lubricator of the class described, a lubricating pad and a unitary supporting plate therefor comprising a thin sheet of springy metal, said plate being normally arcuate laterally and capable of being bent transversely of its length.

2. In a journal lubricator of the class described, a lubricating pad, a resilient unitary supporting plate for said pad, said plate being normally arcuate laterally and capable of being bent transversely of its length, and generally elliptical spring means comprising semi-elliptical spring members hingedly connected at their extremities, said spring means affixed to and radially projecting from the under surface of said plate for supporting said pad against a journal.

JOSEPH T. GREELEY.

REFERENCES CITED

The following references are of record in the file of this patent:

UNITED STATES PATENTS

| Number | Name | Date |
| --- | --- | --- |
| 156,990 | Flynt | Nov. 17, 1874 |
| 667,944 | Kotona | Feb. 12, 1901 |
| 2,106,411 | O'Donnell | Jan. 14, 1936 |
| 2,071,854 | Ross | Feb. 23, 1937 |

FOREIGN PATENTS

| Number | Country | Date |
| --- | --- | --- |
| 51,702 | Austria | Jan. 10, 1912 |
| 815,471 | France | June 12, 1937 |